W. H. HERRMANN.
MACHINE FOR TREATING SEED GRAIN.
APPLICATION FILED JAN. 7, 1919.
1,324,312.
Patented Dec. 9, 1919.
2 SHEETS—SHEET 2.
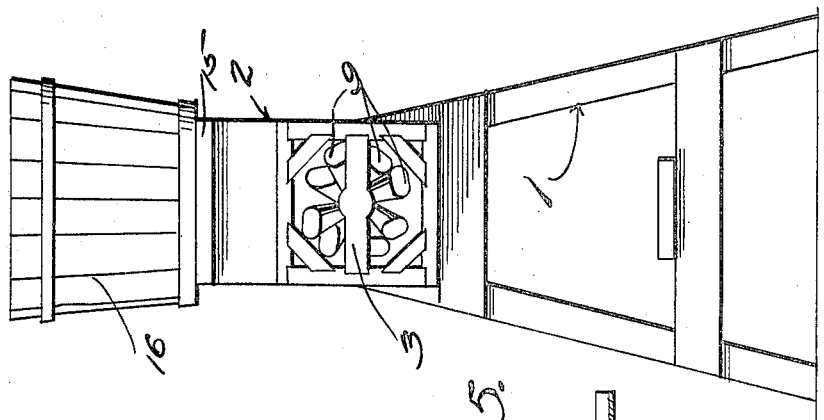
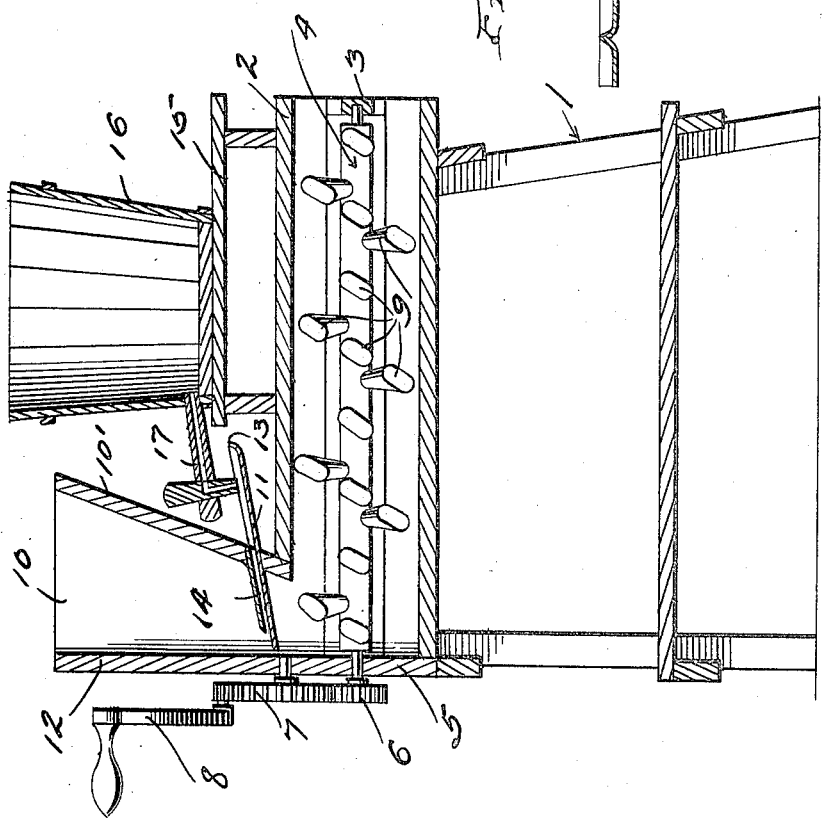

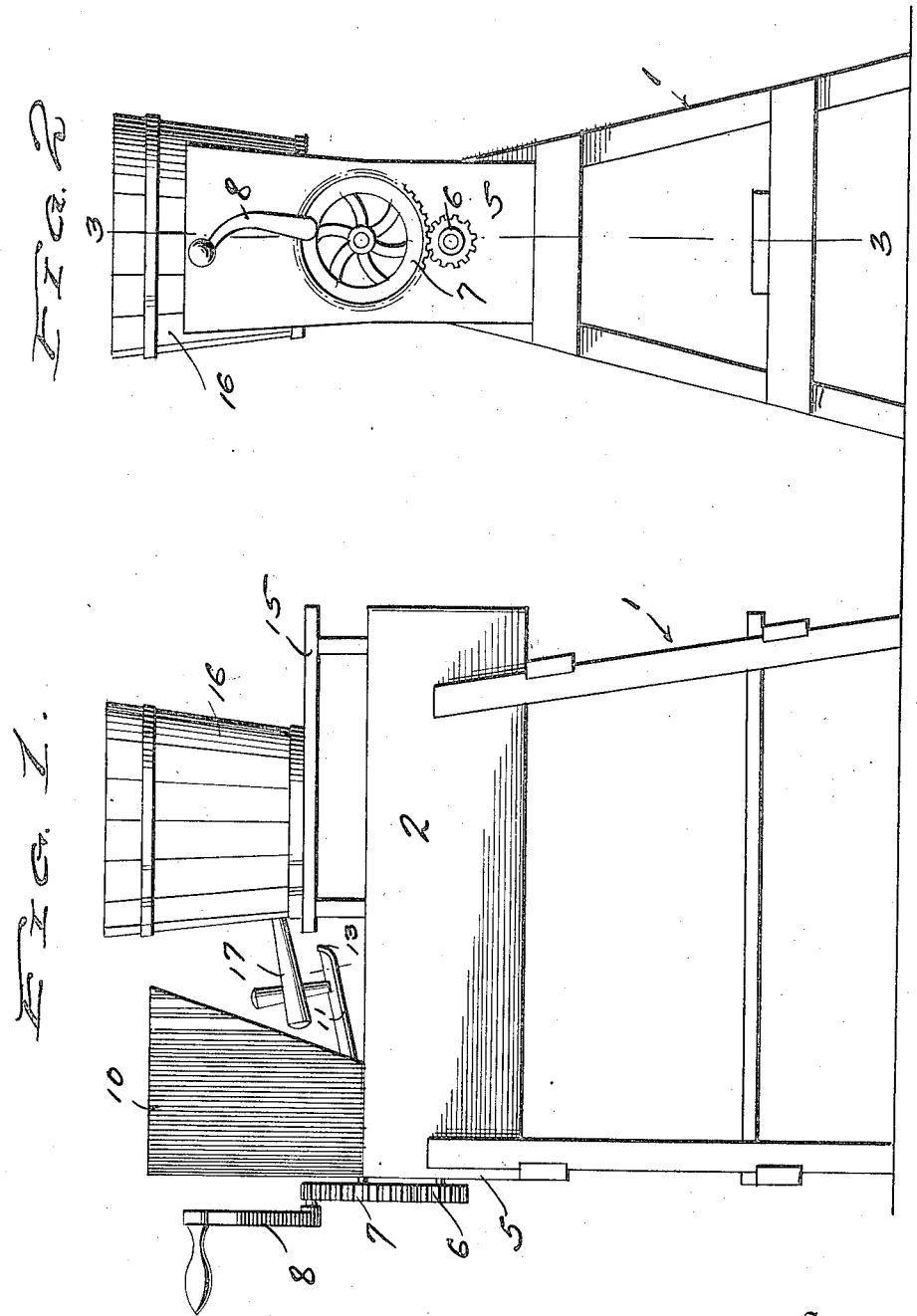

UNITED STATES PATENT OFFICE.

WENZEL H. HERRMANN, OF NORHEIM, MONTANA.

MACHINE FOR TREATING SEED-GRAIN.

1,324,312.　　　　Specification of Letters Patent.　　Patented Dec. 9, 1919.

Application filed January 7, 1919. Serial No. 269,986.

*To all whom it may concern:*

Be it known that I, WENZEL H. HERRMANN, a citizen of the United States, residing at Norheim, in the county of Blaine and State of Montana, have invented certain new and useful Improvements in Machines for Treating Seed-Grain, of which the following is a specification.

This invention relates to agricultural implements, and more particularly to seed treating machines.

The object of the invention is to provide a simply constructed and efficient machine for treating seed grain preparatory to planting.

Another object is to so construct such a machine that the seed will be thoroughly agitated and coated with the formaldehyde or other treating liquid.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a machine constructed in accordance with this invention, Fig. 2 is a front end view thereof, Fig. 3 is a vertical longitudinal section taken on the line 3—3 of Fig. 2, and Fig. 4 is a rear end view.

Fig. 5 is a transverse section of the shutter.

In the embodiment illustrated, the machine constituting this invention is mounted on a suitable supporting frame 1 of any desired construction, and said machine comprises a hollow casing 2 forming an agitating chamber which is closed at its front end and open at its rear end. A cross bar 3 extends transversely of the open rear end and in which is mounted one journal of an agitator 4, the other journal extending through the front wall 5 of the chamber and having fixed to its projecting end a cog gear 6. This cog 6 meshes with a larger gear 7 revolubly mounted on the front wall of the agitator chamber and on which gear is secured a crank handle 8. It will thus be seen that when the large gear 7 is rotated the cog 6 will be rapidly revolved and the agitator correspondingly turned.

The agitator 4 has a plurality of blades or fingers 9 secured thereto and which may be set at any desired angle, and radiating therefrom, said fingers being arranged spirally so as to feed the seed through the chamber 2 and discharge it at the open rear end thereof. This agitator 4 extends the full length of the chamber 2 and the front end thereof is arranged below the hopper 10 which is equipped with an upright front wall 12 and has a sliding shutter 11 extending transversely and obliquely through the lower end of the hopper for regulating the flow of grain from the hopper to the agitator 2. This shutter 11 projects beyond the inclined rear wall 10′ of the hopper and has upturned lips 13 and 13ᵃ to prevent the liquid supplied thereto from splashing off at this end or either side. This shutter 11 operates through a slot in the rear wall 10′ of the hopper and may be slid back and forth to vary the distance of its front end relatively to the front wall 12 of the hopper so that more or less seed may be fed from the hopper to the chamber and at the wishes of the operator.

The shutter guard 14 also extends transversely of the lower end of hopper 10 above the shutter 11, being spaced therefrom a sufficient distance to permit the free passage under it of the liquid which is used for treating the grain and which is supplied by means presently to be described. This shutter guard 14 terminates at its front end at some distance from the front wall 12 of the hopper and is inclined downwardly and forwardly with its end beveled so as to permit the grain resting thereon to be fed through the mouth formed between the front end of the shutter and the hopper wall.

A platform or stand 15 is mounted on the top of the chamber 2 and is designed to support a formaldehyde tank 16 which has a spout or faucet 17 mounted in the front wall thereof at its lower end as is shown clearly in Figs. 1 and 3, and through which the contents of tank 16 are designed to be distributed or fed on to the shutter 11. It is of course understood that this faucet may be turned so as to vary the amount of liquid passing therethrough according to the wishes of the operator.

In the use of this apparatus, the parts being in the position shown in the drawings, the tank 16 having been filled or partially filled with formaldehyde or other liquid, which it is desired to use in treating the grain, the grain is placed in the hopper 10 after the shutter 11 has been properly adjusted to permit the required flow through the mouth thereof. The crank handle 8 is then turned to revolve the agitator 4, the finger 9 of which thoroughly agitates the grain fed from the hopper with the liquid entering at the same time thereby causing all parts of each grain to be subjected to the influence of the liquid and together they are fed out through the open rear end of chamber 2 into a suitable receptacle, not shown.

From the above description it will be obvious that this simply constructed machine, having few parts to get out of order and be replaced, will efficiently solve the problem of treating seed grain and it may be manufactured and sold at a very low cost so that farmers of moderate means may all have them.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

1. A seed grain treating apparatus including a hopper having an obliquely disposed transversely arranged adjustable shutter therein with one end projecting outside the hopper and having its terminal upturned to form an anti-splashing lip, said hopper having an opening in one side wall in which the shutter is mounted to slide, a guard arranged in said opening above said shutter and spaced therefrom, and extending into the hopper with its free end spaced from the front wall of the hopper and beveled, said guard being inclined downwardly and forwardly.

2. A seed grain treating apparatus including a hopper having a shutter slidable transversely across the hopper adapted to receive treating fluid outside of said hopper and to convey the treating fluid within the hopper and provided with transversely spaced longitudinally extending ribs to prevent overflow of the treating fluid at the sides of the shutter.

In testimony whereof I affix my signature in presence of two witnesses.

WENZEL H. HERRMANN.

Witnesses:
EARL F. ROBBINS,
FORREST W. McCULLOUGH.